United States Patent [19]

Heshmat

[11] 4,300,806
[45] Nov. 17, 1981

[54] MULTI-STAGE SUPPORT ELEMENT FOR COMPLIANT HYDRODYNAMIC BEARINGS

[75] Inventor: Hooshang Heshmat, Schenectady, N.Y.

[73] Assignee: Mechanical Technology Incorporated, Latham, N.Y.

[21] Appl. No.: 136,957

[22] Filed: Apr. 3, 1980

[51] Int. Cl.³ .................................. F16C 32/06
[52] U.S. Cl. ........................... 308/9; 308/121; 308/160; 308/237 R; 308/DIG. 1
[58] Field of Search ............... 308/9, 3 R, DIG. 1, 308/121, 122, 160, 163, 168, 164, 170, 237 R, 26, 73, 238, 35

[56] References Cited

U.S. PATENT DOCUMENTS

| | | | |
|---|---|---|---|
| 1,494,010 | 5/1924 | Newhouse | 308/160 |
| 1,684,693 | 9/1928 | Bohm | 308/160 |
| 3,215,479 | 11/1965 | Silver et al. | 308/121 |
| 3,215,480 | 11/1965 | Marley | 308/DIG. 1 |
| 3,298,751 | 1/1967 | Elwell | 308/9 |
| 3,366,427 | 1/1968 | Silver et al. | 308/122 |
| 3,375,046 | 3/1968 | Marley | 308/164 |
| 3,382,014 | 5/1968 | Marley | 308/9 |
| 3,434,761 | 3/1969 | Marley | 308/9 |
| 3,434,762 | 3/1969 | Marley | 308/9 |
| 3,467,451 | 9/1969 | Marley | 308/122 X |
| 3,495,886 | 2/1970 | Roberts et al. | 308/163 |
| 3,504,953 | 4/1970 | Love | 308/9 X |
| 3,506,314 | 4/1970 | Gross et al. | 308/9 |
| 3,511,544 | 5/1970 | Marley | 308/3 R |
| 3,520,578 | 7/1970 | Licht | 308/9 |
| 3,542,440 | 11/1970 | Brand et al. | 308/9 |
| 3,552,815 | 1/1971 | Keller | 308/238 |
| 3,615,121 | 10/1971 | Barnett et al. | 308/9 |
| 3,635,534 | 1/1972 | Barnett | 308/121 |
| 3,642,331 | 2/1972 | Silver | 308/35 |
| 3,677,612 | 7/1972 | Barnett et al. | 308/9 |
| 3,747,997 | 7/1973 | Winn | 308/9 |
| 3,750,249 | 8/1973 | Brandon et al. | 308/237 R X |
| 3,795,427 | 3/1974 | Licht et al. | 308/9 |
| 3,806,209 | 4/1974 | Laing et al. | 308/9 |
| 3,809,443 | 5/1974 | Cherubim | 308/9 |
| 3,884,534 | 5/1975 | Winn | 308/9 |
| 3,893,733 | 7/1975 | Silver et al. | 308/9 |
| 3,951,474 | 4/1976 | Hughes et al. | 308/9 |
| 3,957,317 | 5/1876 | Silver | 308/9 |
| 4,005,914 | 2/1977 | Newman | 308/9 |
| 4,082,375 | 4/1978 | Fortmann | 308/160 X |
| 4,116,503 | 9/1978 | Licht | 308/9 |
| 4,118,079 | 10/1978 | Newman et al. | 308/9 |
| 4,133,585 | 1/1979 | Licht | 308/9 |
| 4,167,295 | 9/1979 | Glaser | 308/9 |
| 4,170,389 | 10/1979 | Eshel | 308/9 |
| 4,208,076 | 6/1980 | Grey | 308/9 |
| 4,222,618 | 9/1980 | Miller, Jr. | 308/9 |
| 4,223,958 | 9/1980 | Grey | 308/9 |
| 4,227,756 | 10/1980 | Bhustan | 308/DIG. 1 |
| 4,262,975 | 4/1981 | Heshmat et al. | 308/9 |

Primary Examiner—Stuart S. Levy
Attorney, Agent, or Firm—Joseph V. Claeys

[57] ABSTRACT

A compliant hydrodynamic fluid film bearing includes a flexible bearing sheet overlying and supported by a resilient support element having two corrugated spring foil support elements arranged in a staged, parallel spring array. The top spring element is more compliant in the bottom spring element and provides a compliant support for the bearing sheet at low rotor speeds to provide early development of load bearing capacity. With increasing rotor speed, the top support element deflects to the level of the second or lower support element which is stiffer and provides stronger support at higher speeds. At these higher speeds, the combined support element supports the bearing sheet at the correct profile to the moving bearing member and prevents collapse of the support element so that the bearing remains operative at high and ultra high speeds despite the increased load and stiffness of the hydrodynamic fluid film.

10 Claims, 8 Drawing Figures

MULTI-STAGE SUPPORT ELEMENT FOR COMPLIANT HYDRODYNAMIC BEARINGS

This invention relates to complaint bearings and more particularly to a multi-stage support element for a complaint hydrodynamic fluid-film bearing.

Hydrodynamic fluid-film bearings are becoming increasingly attractive in many high-speed applications because of the low power losses associated with these bearings and because of their ability to function in the absence of liquid lubricants. These bearings are thus uniquely applicable in ultra-high-speed applications wherein the rotor speed exceeds the limits of rolling element bearings, and in applications where the weight, cost, and necessary maintenance for conventional oil lubrication are unacceptable.

Hydrodynamic fluid-film tilt pad journal and thrust bearings are often used for the applications mentioned above, but the range of the conditions of use of these bearings is somewhat limited and the bearings are susceptible to damage or failure in the event that this range is exceeded. For example, the load capacity at speeds below and above the design operating point decreases, and the bearing is sensitive to shock and misalignment, and thermal distortion.

Compliant hydrodynamic fluid-film bearings provide significant improvements over the rigid tilt pad bearing, and indeed have been improved so significantly in the last several years that they are likely candidates to replace entirely the rigid tilt pad bearing, but there are still some areas in which improvement would be desirable. For example, a greater load capacity at low speeds would increase the number of applications in which these bearings can be used. In addition, greater shock and misalignment tolerance would increase the bearing durability in aircraft and ground vehicles subject to shock and high acceleration.

Some of these aspects of the bearing operation have already been improved in my prior U.S. Patent Application Ser. No. 4,277,112 entitled "Stepped, Split, Cantilevered Compliant Bearing Support" issued on July 7, 1981, the disclosure of which is incorporated herein by reference, but further improvements would be desirable. It is anticipated that the invention of this copending application will be utilized in the embodiment of the invention disclosed herein.

SUMMARY OF THE INVENTION

Accordingly, it is an object of this invention to provide a compliant hydrodynamic fluid-film bearing which has a high load carrying capacity over a greater range of rotor speeds, and provides improved tolerance for shock, vibration, and misalignment.

These objects are achieved in the disclosed embodiments of the invention, which include a flexible bearing sheet overlying and supported by a resilient support element which is soft at small deflections and becomes increasingly stiff and increasingly strong with increasing deflections so that at low speeds the support element can deflect readily to present an optimum profile to the moving bearing member to generate a supporting hydrodynamic fluid film at low speeds, and at medium and high speeds the increasing stiffness and strength of the support element supports the bearing sheet at the correct profile to the moving bearing member and prevents collapse of the support element so that the bearing remains operative at high and ultra-high speeds despite the increased load and stiffness of the hydrodynamic fluid film.

DESCRIPTION OF THE DRAWINGS

The invention and its stated and implicit objects and advantages will become better understood upon reading the following detailed description of the preferred embodiments in conjunction with the following drawings, wherein:

FIG. 5 is an enlarged elevation of one resilient support projection of an extension of the invention shown in FIG. 3a.

DESCRIPTION OF THE PREFERRED EMBODIMENT

Figure 1:
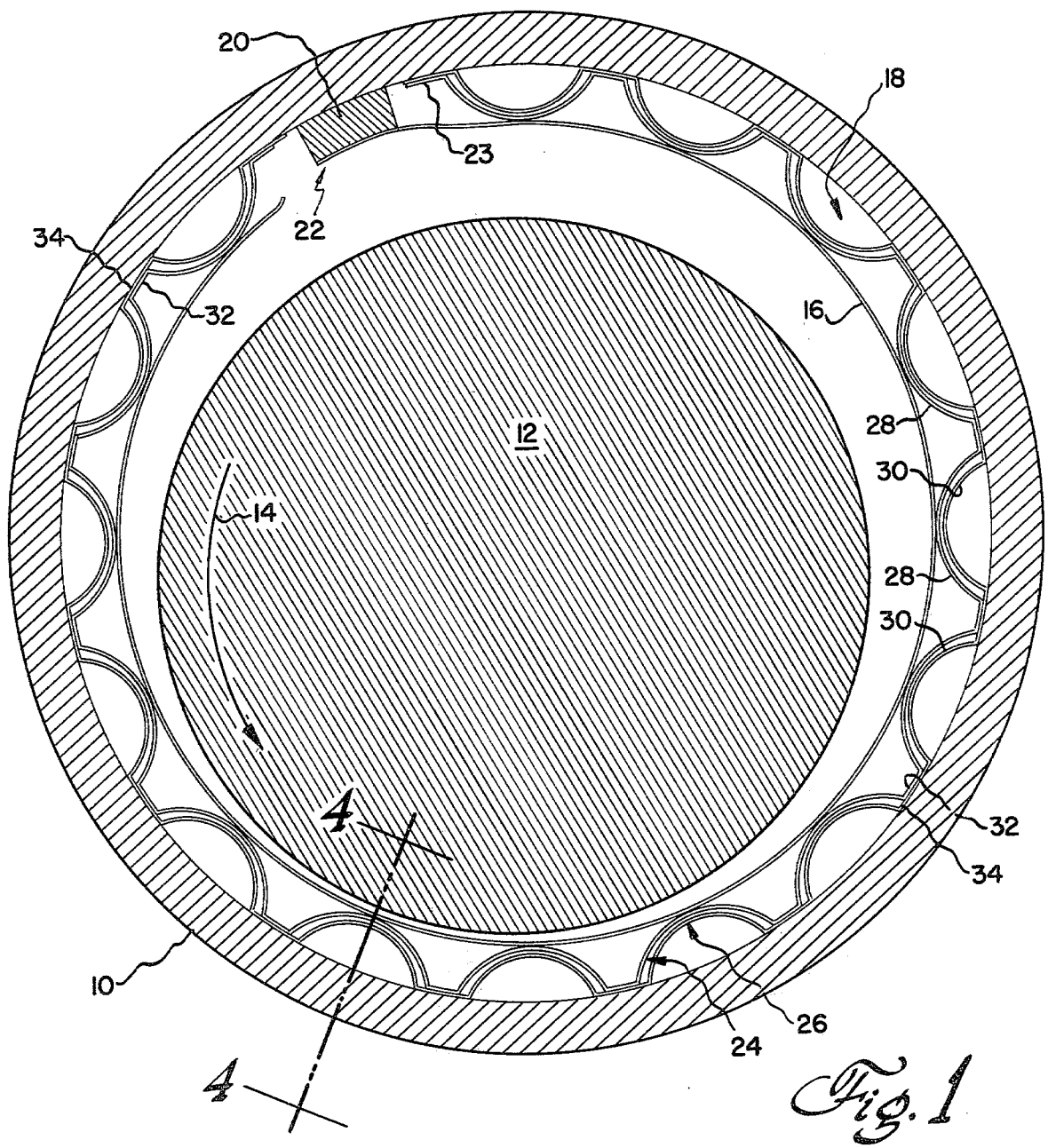
FIG. 1 is a sectional elevation of a journal bearing made in accordance with this invention.

Referring now to the drawings wherein like reference characters designate identical or corresponding parts, and more particularly to FIG. 1 thereof, a journal bearing is shown having a journal sleeve 10 supporting a shaft 12 rotating in the direction of the arrow 14. A bearing assembly is attached to the inner wall of the journal sleeve 10 and includes a flexible bearing sheet 16 supported by a resilient compliant support element 18. The bearing sheet 16 is attached, as by welding, at the trailing edge 22, with respect to the direction of rotation of the shaft 12, to a spacer block 20, itself welded to the journal sleeve. The support element 18 is attached, also at its trailing edge 23, directly to the journal sleeve 10.

Figure 2:
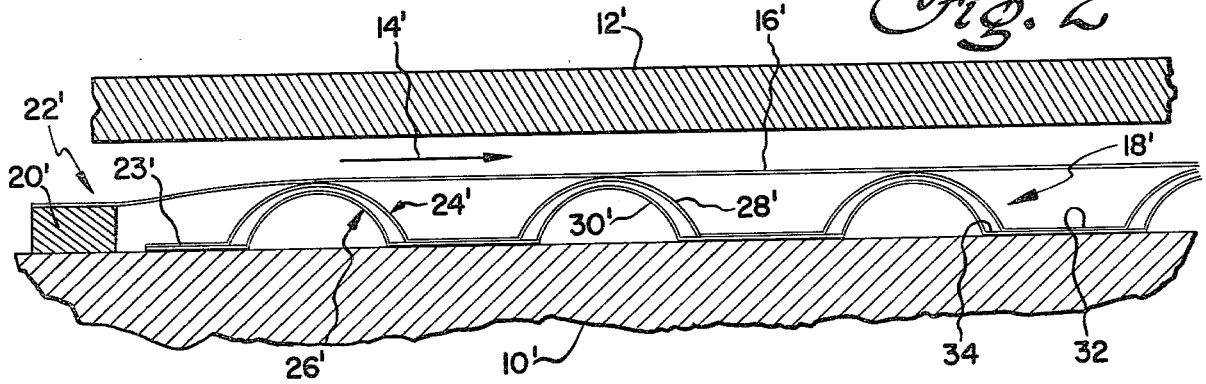
FIG. 2 is a partial sectional elevation of a thrust bearing made in accordance with this invention.

The second embodiment of the invention is a thrust bearing illustrated in FIG. 2. The thrust bearing includes a thrust plate 10' axially supporting a thrust runner 12' rotating in the direction of the arrow 14'. The runner 12' is supported on a hydrodynamic fluid film generated over a thin flexible bearing sheet 16' which is supported on a resilient compliant support element 18'. The bearing sheet 16' is fastened at its leading edge 22' to a spacer block 20' and the support element 18' is fastened at its leading edge 23' to the thrust plate 10'.

The operation of the support element 18 in supporting the bearing sheet 16 in the journal bearing is sufficiently alike the operation of the corresponding primed elements in the thrust bearing that a single description of the operation will suffice for both embodiments of the invention, except where differences are specifically described. Therefore, the invention will be described in connection with the journal bearing with the understanding that one skilled in the art will be able to apply this description to the operation of the thrust bearing.

The support element 18 includes two foil members arranged in a stacked or nested arrangement. The top or first foil member 24 overlies the bottom or second foil member 26. Each foil member is formed with a series of bumps or corrugations 28 and 30, respectively, spaced along the length of the foil members and separated by flat land portions 32 and 34, respectively. The land portions 32 and 34 of the foil support members are in contact with each other at all times, but the crest of the bumps or corrugations 28 and 30 are in contact only during high load periods of the bearing operation. Thus, the height of the corrugation 30 on the bottom foil support member 26 is lower than the height of the bumps or corrugations 28 on the top foil support member 24 so that a gap exists between the crests of the aligned or nested bumps 28 and 30.

This arrangement provides a staged, parallel spring array. The term "staged" means that only the springs formed by the bumps 28 of the top foil support member 24 are operative at low loads, and at higher loads, the top foil bumps 28 deflect down to the level of the bumps 30 on the bottom foil support member 26 at which time they become operative. Thus, the two spring systems become operative in sequence, or in "staged" order.

The term "parallel" means that the springs are arranged in parallel rather than in series. That is, the two spring systems share the load between them so that each spring system carries only a portion of the load rather than the full load, as in a series spring array. Of course, the lower bumps 30 do not carry any load until the top bumps 28 deflect to their level, but when they do, the combination is a parallel spring array.

The lower bumps 30 are stiffer than the top bumps 28, so their effect is "dominant" when they are operative. That is, the spring characteristic of the spring array is primarily determined by the spring characteristic of the lower bumps 30 when they are operative. When only the top bumps 28 are operative, their effect is "dominant" in the sense that their spring characteristic determines the spring characteristics of the array.

In operation, the rotor 12 starts rotating over the bearing sheet 16 and drags the rotor's boundary layer of gas or other lubricant into the converging wedge-shaped gap between the rotor bearing surface and the bearing surface of the bearing sheet 16. The converging wedge-shaped gap is inherently formed in the journal bearing by virtue of the slight eccentricity of the shaft axis relative to the journal sleeve axis, and is intentionally formed in the thrust bearing by the spacer block 20' being lower than the first bump 28'.

At low speeds, a soft compliant bearing assembly provides high load capacity which increases rapidly with increasing rotor speed. At moderate rotor speed, however, the load carrying capacity suddenly drops, thus forming an upper limit for soft compliant bearings which is too low for most applications. I believe that this loss of load carrying capacity is a consequence of the soft support element's low stress capacity which is exceeded by the load on the bearing at moderate rotor speeds.

At low speeds, a stiff "compliant bearing" assembly provides low load carrying capacity. I believe this is because the bearing support element is too stiff to permit the bearing sheet to deform under the hydrodynamically generated gas cushion, so the operative area of the converging wedge is too small. Although the pressure of the gas cushion in the region of the converging wedge is probably adequate, the area of the converging wedge is so small that the total pressure force exerted by the gas cushion is not sufficient to provide adequate load carrying capacity. Whether or not this theory is correct, my empirical observation is certainly valid: stiff "compliant bearings" do not provide satisfactory load carrying capacity until the rotor speed becomes substantial.

At moderate to high speeds, the load carrying capacity of the soft and stiff bearings reverses: the soft bearing loses its capacity and the stiff bearing gains its capacity. My theory is also consistent with this observation. The higher rotor speed generates a high-pressure gas cushion over the bearing assembly which exceeds the stress capacity of the soft support element and flattens it. The soft bearing assembly thus becomes essentially equivalent to a rigid journal sleeve bearing. The stiff bearing assembly, on the other hand, is much stronger than the soft bearing, and its stress capacity is not exceeded. It is thus able to deflect under the high pressure, hydrodynamically generated gas cushion to spread the cushion over a large area of the rotor surface and thereby achieve a significantly greater load bearing capacity than the soft or rigid bearing.

At high rotor speeds, the problems of synchronous and halfspeed whirl become significant. I have solved these problems in the invention described in my prior U.S. Pat. No. 4,277,113 entitled "Composite Material Compliant Bearing Element" issued on July 7, 1981, the disclosure of which is incorporated herein by reference. The invention of this copending application may be incorporated in the disclosed embodiments of this invention by forming the members of the bearing assembly out of the material disclosed in said copending application.

Figure 3A:
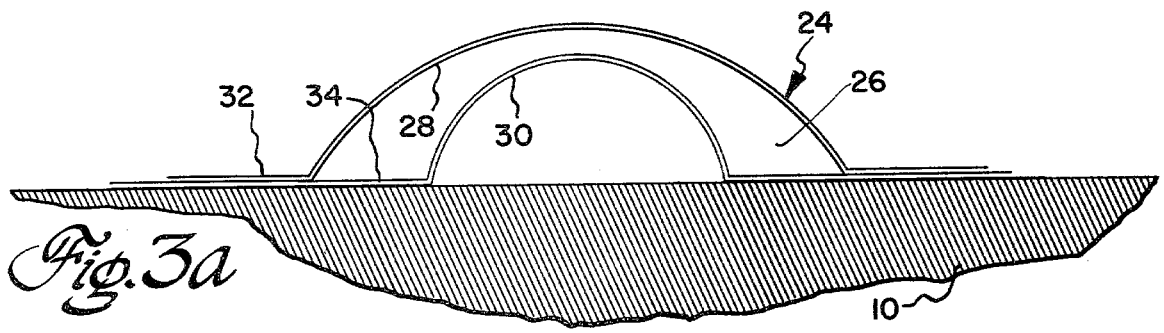
FIG. 3a is a sectional elevation of one resilient support projection of the support element shown in FIG. 1 in its undeflected configuration.
Figure 3B:
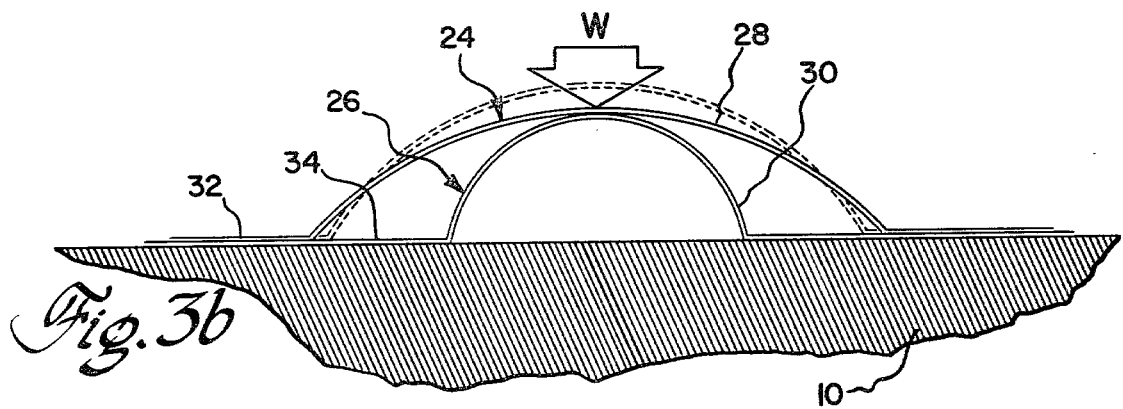
FIG. 3b is a sectional elevation of the structure shown in FIG. 3a but with the top projection deflected under load to the top of the lower projection.
Figure 3C:
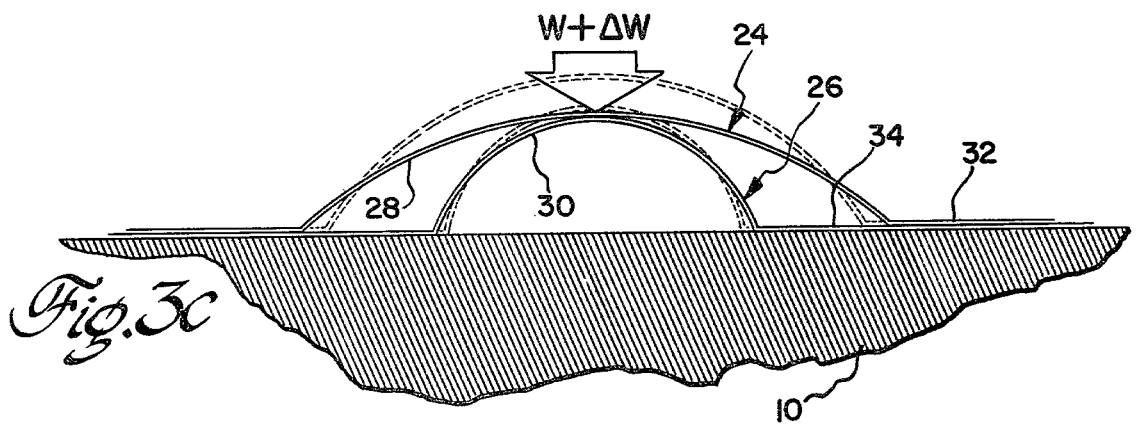
FIG. 3c is a sectional elevation of the structure shown in FIGS. 3a and 3b but with the top and bottom support projection deflected under high load.

The damping provided by the composite materials of which the bearing assembly members are formed, as described in the aforesaid U.S. Pat. No. 4,277,113, is enhanced by the greater degree of coulomb damping afforded by the structure disclosed herein. The coulomb, or rubbing frictional damping, is a function of pressure, frequency and stroke. Thus, at low speeds when coulomb damping is not needed and would represent an undesirable power loss during start-up of the machine when shaft torque is low, as in a gas turbine, the damping is minimal because there is little movement of the bearing assembly members relative to each other. As the rotor speed increases, the need for damping also increases because bearing instability is primarily a high-speed phenomenon. The damping provided by this structure occurs during periodic partial deflection of the top bump, as shown in FIGS. 1, 2, and 3a, by virtue of the frictional sliding engagement of the land portions 32 and 34 of the top and bottom support foils. The periodic deflection or partial flattening of the bumps on the top support foil member is caused by slight eccentricities of the rotor which act as cams to depress the bearing assembly at each revolution of the rotor. This partial flattening or deflection of the bumps causes an elongation and bodily longitudinal translation of the entire foil member so that all of the land portions 32 of the top foil member 24 move relative to the land portions 34 on the bottom foil support member 26. This damping increases substantially when the bumps 28 on the top foil support member 24 deflect sufficiently to engage the bumps 30 on the bottom foil support member 26 because the bumps move longitudinally with respect to each other. They act as relatively sliding wedges in this configuration and generate tension and compression stresses in the foil materials which increases the rubbing interface pressure and thereby increases the coulomb damping.

Figure 4:
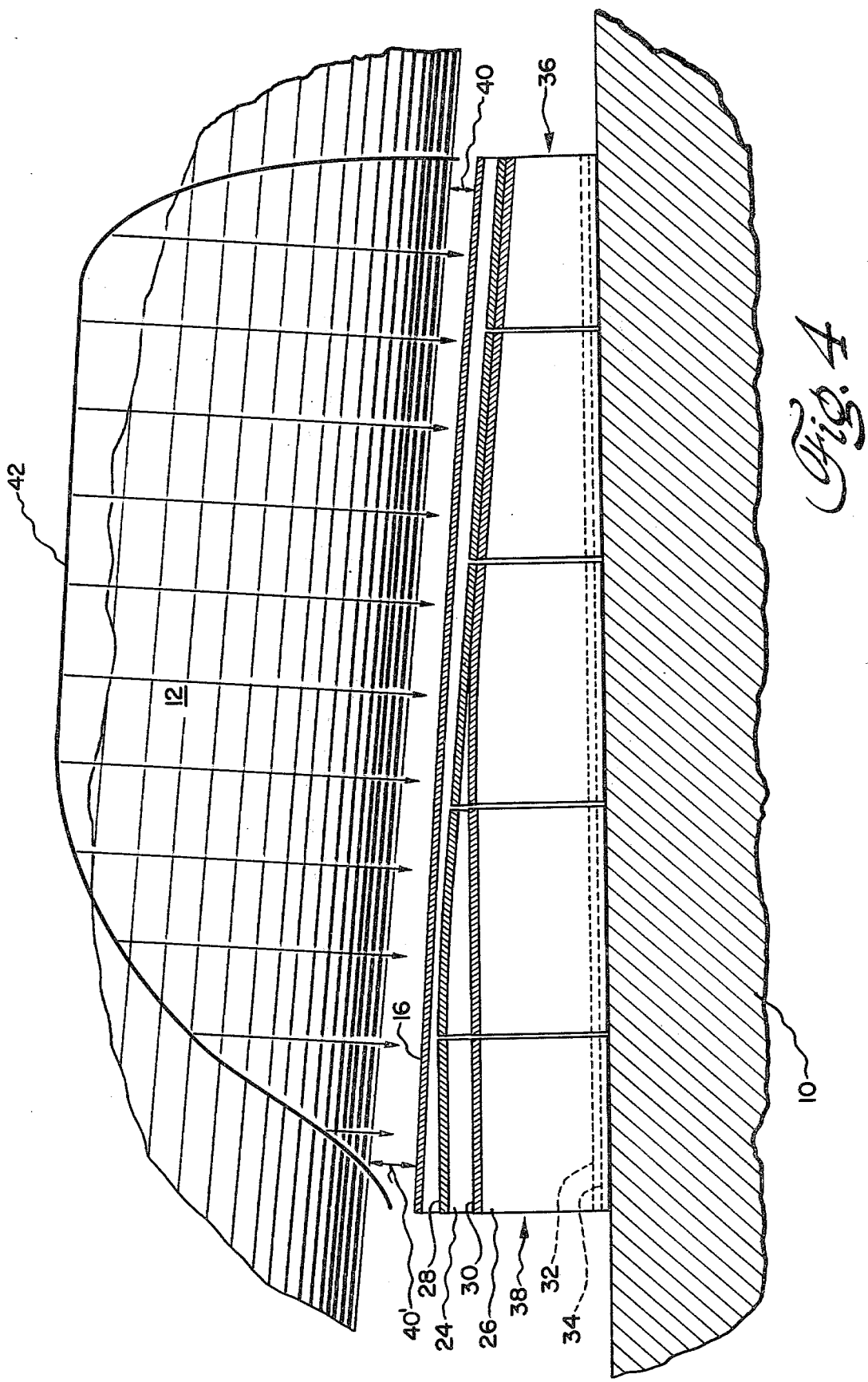
FIG. 4 is a sectional elevation of the bearing along lines 4—4 and an imposed pressure profile of the hydrodynamic fluid film over the bearing sheet in a condition of gross eccentric shock or misalignment.

As most clearly shown in FIG. 4, the top and bottom foil support members 24 and 26 are slit in the manner and for the purpose taught in my prior U.S. Pat. No. 4,277,111 entitled "Compliant Hydrodynamic Thrust Bearing" issued on July 7, 1981, the disclosure of which is incorporated herein by reference. This enables the support members 24 and 26 to deflect at lateral positions along the length of the bumps in accordance with the pressure profile of the overlying gas cushion, and enables the bearing to tolerate bearing misalignment and skew loads. This effect is enhanced by this invention which provides a soft layer of support staged in parallel with a stiff layer of support. As shown in FIG. 4, the relative misalignment (shown grossly exaggerated in FIG. 4 for clarity of illustration) of the stationary mounting member 10, such as the journal sleeve, and the rotating rotor 12 causes substantial deflection of the bumps of the foil support members at one edge 36 of the bearing assembly, which lies parallel to the direction of rotor rotation, and very little deflection at the opposite edge 38. This enables the clearance 40 and 40' between the rotor surface and the bearing sheet at the two ends 36 and 38 of the bearing, respectively, to remain substantially uniform across the rotor surface, within the constraints imposed by the pressure profile 42 of the overlying gas cushion, and it also enables the pressure profile across the bearing sheet to be much more uniform since the bearing clearance is much more uniform, so the load capacity of the bearing does not suffer as much in misalignment situations as it does in the prior art. In addition, the heat generated in the fluid film and transferred to the bearing sheet 16 is much more uniform from edge 36 to edge 38 than would be the case if the clearance were much greater at one edge than the other. This uniformity of heat generation in the bearing sheet prevents localized heat distortion in the bearing sheet which otherwise could cause the sheet to expand in the area of smallest clearance 40 and "balloon" upwardly into contact with the bearing surface of the rotor 12 with consequent damage to the bearing.

Figure 5:
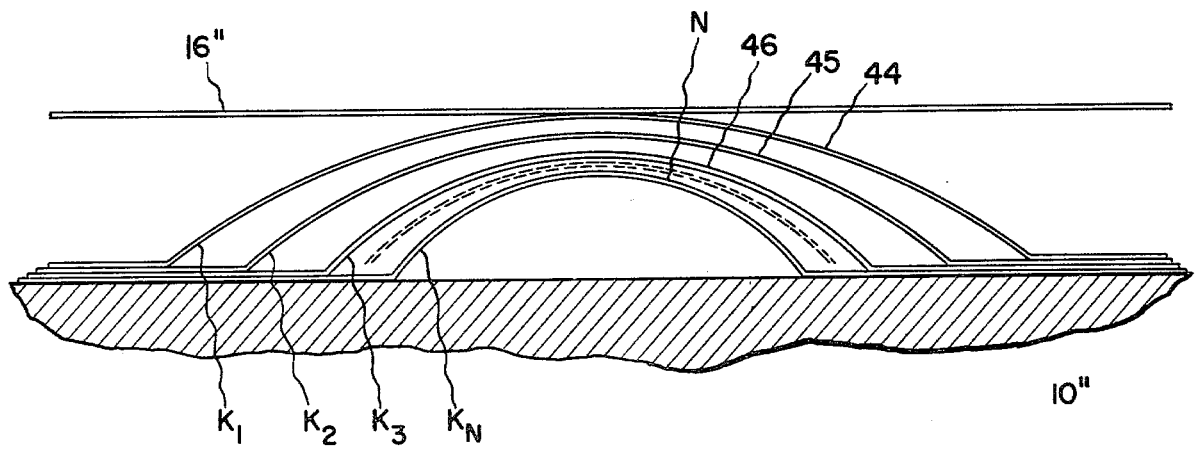

An extension of the invention is illustrated in FIG. 5 wherein multiple foil support members 44, 45, 46 to N are shown formed of high-temperature, high-strength alloy such as Inconel X750. The bumps on the top member 44 are the softest because their radius of curvature is greater than the others, and because they are formed of thinner material. The bumps deflect in sequence to present a staged parallel spring array of increasing stiffness, $K_1$, $K_2$, $K_3$ to $K_N$, with increasing load on the bearing sheet 16".

The damping provided by this arrangement is enhanced because the surface area which is active in the coulomd damping interface is increased without decreasing the interface pressure. This enhanced damping is available even at moderate loads because the lands between the bumps are always in series contact, even though the bumps are in staged, parallel array.

This damping can be further enhanced by making one or more of the foil support members, for example member 46, out of a material having a higher coefficient of friction with the materials of the other foil support members. A copper foil member may be used which has a much higher coefficient of friction with Inconel X750 than Inconel X750 does.

Alternatively, the foil support members may be formed of the material disclosed in my aforesaid U.S. Pat. No. 4,277,113. This arrangement has the advantage of improved damping and improved strength at high temperature, as fully explained in the patent specification.

Figure 6:
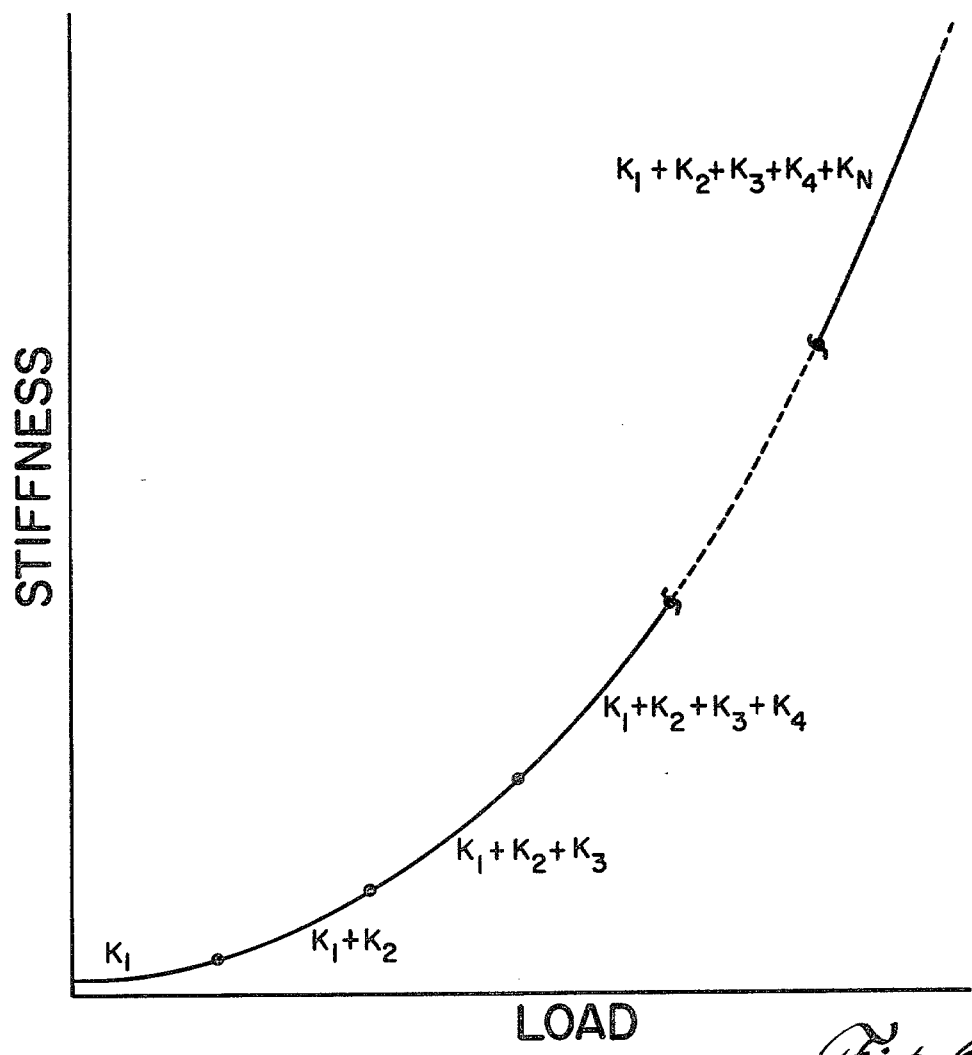
FIG. 6 is a load-deflection graph of the support projection shown in FIG. 5 illustrating the increasing stiffness with increasing load.

The spring characteristic of the support element of FIG. 5 is shown in FIG. 6. It graphically illustrates a virtually ideal characteristic for a compliant bearing support. It provides a soft surface for early establishment of a good load bearing gas cushion at low rotor speeds, then presents an increasingly stiff bearing surface as the rotor speed and load increase, and an extremely strong bearing sheet support to tolerate impulse and shock loads without damage to the bearing.

Obviously, numerous modification and variations of the disclosed embodiments are possible, and it is contemplated that the invention will be used in many different forms.

Therefore, it is to be understood that all these different forms and their equivalents may be practiced while remaining within the spirit and scope of the invention defined in the following claims, wherein I claim:

1. A compliant hydrodynamic fluid film bearing, comprising:
   first and second relatively moving members defining therebetween a gap;
   a bearing assembly disposed in said gap and attached to said first member, said second member rotating relative to said bearing assembly and generating a hydrodynamic fluid film between said bearing assembly and said second member for dynamic support of one member by the other member;
   said bearing assembly including a smooth flexible thin bearing sheet and a resilient support element underlying and supporting said bearing sheet in bearing relationship to said second member;
   said support element deflecting under the load exerted by said hydrodynamic fluid film to present an inclined bearing surface of said bearing sheet to the relatively moving surface of said second member;
   said support element being formed of at least two separate foil members, stacked one over the other;
   each of said foil members having raised resilient projections which provide the resilient, compliant support for said bearing sheet, said projections being distributed across said foil members in a similar pattern on both foil members such that said projections are aligned perpendicularly beneath the plane of the overlying bearing sheet in operation;
   said projections on said other foil member being smaller, stiffer, and stronger than said projections on said one foil member;
   whereby said projections constitute a staged parallel spring array for supporting said bearing sheet on said one foil member at low speed, low load conditions wherein greater compliance is desired, and during high-speed, high-load conditions said one foil member projections deflect to the level of said other foil member projections which are stiffer than said one foil member projections and, with said other foil member projections, support the increased load with increased stiffness and damping.

2. The bearing defined in claim 1, wherein:

said projections on said foil members are continuous bumps or corrugations formed on said foil members.

3. The bearing defined in claim 2, wherein said other foil member bumps engage said one foil member bumps upon deflection of the latter bumps, in the region of the center of said latter bumps.

4. The bearing defined in claim 1, wherein said projections on said other foil member are of a shape having inherently greater stiffness than said projections on said one foil member.

5. The bearing defined in claim 4, wherein said projections on both foil members are bumps or corrugations formed thereon, and said bumps on said other foil member are of a small radius of curvature than the bumps on said one foil member.

6. The bearing defined in claim 1, further comprising a third foil member disposed between said one and said other foil members and formed of a material having a high coefficient of friction with said one and said other foil members for enhanced damping.

7. The bearing defined in claim 1, wherein said one foil support member is formed of a thinner gauge metal than said other foil support member.

8. The bearing defined in claim 1, further comprising a third foil member disposed between said one and said other foil members and having a pattern of raised resilient projections thereon distributed across said third foil member in a pattern similar to that of said one and said other foil member so that the projections of all three foil members are nested in an array of aligned stacks; said third foil member projections being intermediate in stiffness between said one and said other foil member projections.

9. A hydrodynamic compliant fluid film bearing, comprising:

a stationary element and a relatively rotating rotor having a bearing surface and defining with said stationary element a gap;

a compliant bearing assembly disposed in said gap and including a thin, flexible bearing sheet attached at one end thereof to said stationary element, and a resilient support element disposed between said bearing sheet and said stationary element;

said support element having a compliant portion and a stiff portion arranged in a staged parallel sequence, said compliant portion being dominant when the load on said support bearing is below a predetermined value;

said support element stiff portion being dominant when the load on said bearing exceeds said predetermined value;

said compliant portion and said stiff portion interacting to increase damping when said bearing load exceeds said predetermined value;

whereby said support element is initially compliant during low speed, low load phases of the bearing operation when compliance is needed for load carrying capacity, and is stiff and damping for high-speed, high-load phases of the bearing operation when stiffness and damping are needed for high-load carrying capacity, shock tolerance, and stability.

10. The bearing defined in claim 9, wherein said compliant portion and said stiff portion each includes a foil member having raised resilient projections formed thereon, said projections on the two foils being aligned and spaced apart when said load is below said predetermined value, so said load is borne only by said compliant portion projections, said compliant portion projections deflecting, under a load which exceeds said predetermined value, into contact with said stiff portion projections, so that said projections on both of said foils are biased between said stationary element and said bearing sheet when said load exceeds said predetermined value.

* * * * *